United States Patent [19]
Gauthier

[11] Patent Number: 5,373,482
[45] Date of Patent: Dec. 13, 1994

[54] DISTANCE MEASURING SYSTEM ARRANGED TO LIMIT FALSE INDICATIONS OF DISTANCE MEASUREMENTS

[75] Inventor: Dale R. Gauthier, Cedar, Mich.
[73] Assignee: Trend Tec Inc., Traverse City, Mich.
[21] Appl. No.: 12,827
[22] Filed: Feb. 3, 1993

Related U.S. Application Data

[63] Continuation-in-part of Ser. No. 908,267, Jul. 2, 1992, Pat. No. 5,303,205, which is a continuation-in-part of Ser. No. 484,626, Feb. 26, 1990, Pat. No. Des. 340,903.

[51] Int. Cl.$^5$ .............................................. G01S 15/00
[52] U.S. Cl. ..................................... 367/99; 367/13; 367/909
[58] Field of Search .................... 367/13, 99, 909, 900, 367/901; 342/118; 364/561; 340/903; 356/4, 5

[56] References Cited

U.S. PATENT DOCUMENTS

| | | | |
|---|---|---|---|
| 3,738,749 | 6/1973 | Everest | 356/5 |
| 4,019,169 | 4/1977 | Takamizawa | 367/105 |
| 4,028,662 | 6/1977 | Young | 367/909 |
| 4,240,152 | 12/1980 | Duncan et al. | 367/909 |
| 4,264,788 | 4/1981 | Kiedel et al. | 340/621 |
| 4,278,962 | 7/1981 | Lin | 367/909 |
| 4,326,273 | 4/1982 | Vancha | 367/909 |
| 4,404,541 | 9/1983 | Kodera et al. | 367/909 |
| 4,467,313 | 8/1984 | Yoshino et al. | 367/909 |
| 4,500,977 | 2/1985 | Gelhard | 367/909 |
| 4,551,722 | 11/1985 | Tsuda et al. | 367/909 |
| 4,606,015 | 8/1986 | Yamaguchi | 367/99 |
| 4,618,948 | 10/1986 | Sakakibara et al. | 367/909 |
| 4,626,850 | 12/1986 | Chey | 340/903 |
| 4,636,997 | 1/1987 | Toyama et al. | 367/909 |
| 4,674,069 | 6/1987 | Mizuno | 367/90 |
| 4,674,073 | 6/1987 | Naruse | 367/909 |
| 4,677,595 | 6/1987 | Obayashi et al. | 367/13 |
| 4,677,595 | 6/1987 | Obayashi et al. | 367/13 |
| 4,694,295 | 9/1987 | Miller et al. | 340/903 |
| 4,695,161 | 9/1987 | Reed | 356/254 |
| 4,789,970 | 12/1988 | Levallois | 367/99 |
| 4,903,004 | 2/1990 | Starke et al. | 340/903 |
| 4,937,796 | 6/1990 | Tendler | 367/909 |
| 4,943,796 | 7/1990 | Lee | 340/903 |
| 4,964,104 | 10/1990 | Capurka | 367/99 |
| 4,974,215 | 11/1990 | Bolz et al. | 367/909 |
| 5,008,862 | 4/1991 | Shimamota et al. | 367/99 |
| 5,053,979 | 10/1991 | Etoh | 340/903 |
| 5,059,946 | 10/1991 | Hollowbush | 367/909 |
| 5,153,559 | 10/1992 | Atsumi | 340/903 |
| 5,160,927 | 1/1992 | Cherry et al. | 367/909 |
| 5,173,881 | 10/1992 | Sindle | 367/909 |

OTHER PUBLICATIONS

"Ultrasonic Ranging System", Description, operation and use information for conducting tests and experiments with Polaroids' Ultrasonic Ranging System components, 1987.
"Home In on the Range!" An Ultrasonic Ranging System, by Steve Ciarcia, 1980.
Technodyne Research International Incorporated, "PROTEX Safety Sensors", brochure, 1991.
BAT Computerized Reversing Aid Poron Car Electronics and Accessories.
Polaroid Utrasonic Ranging System Handbook Application Notes/Technical Papers, 1983.
SCAN Owners/Installation Manual, Part No. 208834, 1990.
"SCAN Backs You Up And Gives You Benefits* On The Side", excerpted by Whitler from Commercial Carrier Journal 1989, Copyright 1989 Chilton Company.
SCAN System, stamped Jan. 13, 1992.

*Primary Examiner*—Daniel T. Pihulic
*Attorney, Agent, or Firm*—Lowe, Price, LeBlanc & Becker

[57] ABSTRACT

A distance measuring system includes a device for detecting ringing signals (false echoes) generated by ultrasonic transducers used to generate probe signals and detect echoes of the probe signals to determine the distance of an external object from the measurement system. The absence or duration of ringing signals are determined, and the display of the distance measuring system is operated accordingly. False indications of distance measurements are limited by storing a number of distance measurements in a memory, and selecting the measurement most likely to indicate the presence of an object from which the distance to the measuring system is determined.

26 Claims, 16 Drawing Sheets

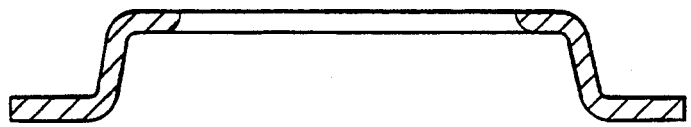
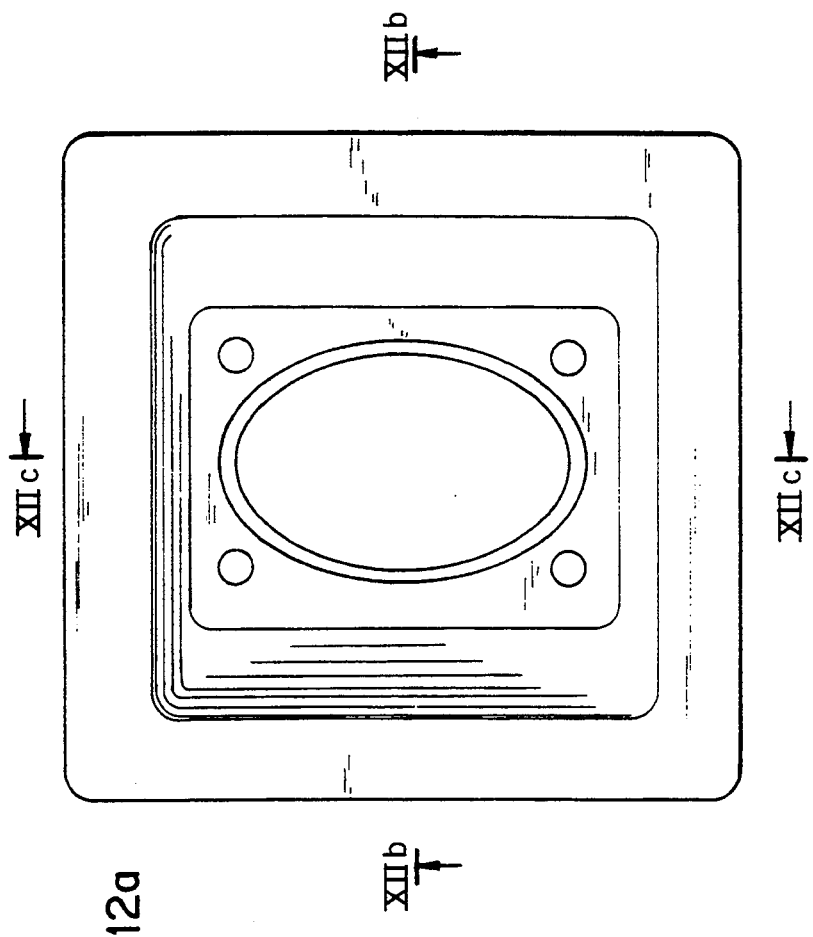
Fig. 12c
Fig. 12a
Fig. 12b

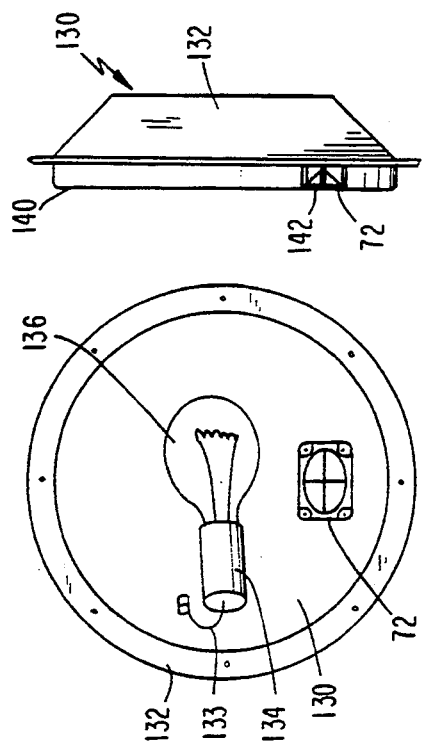
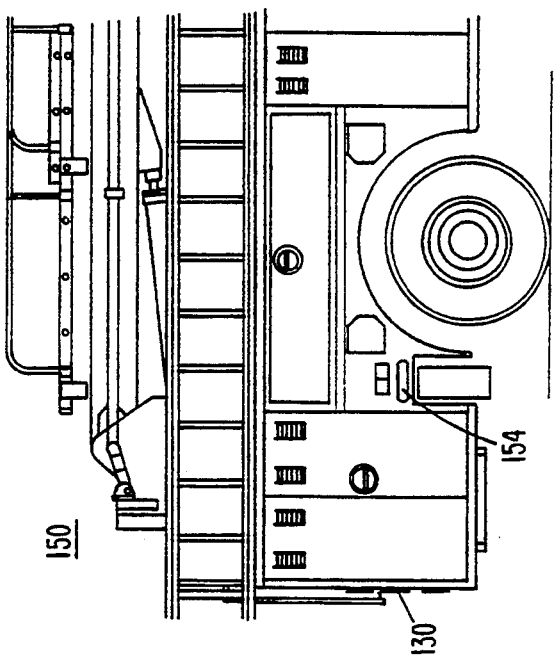
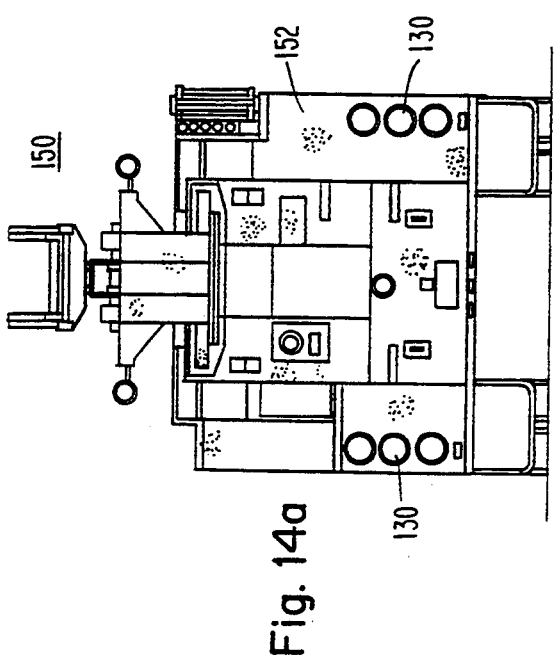

| FIG. 16a |
| FIG. 16b |

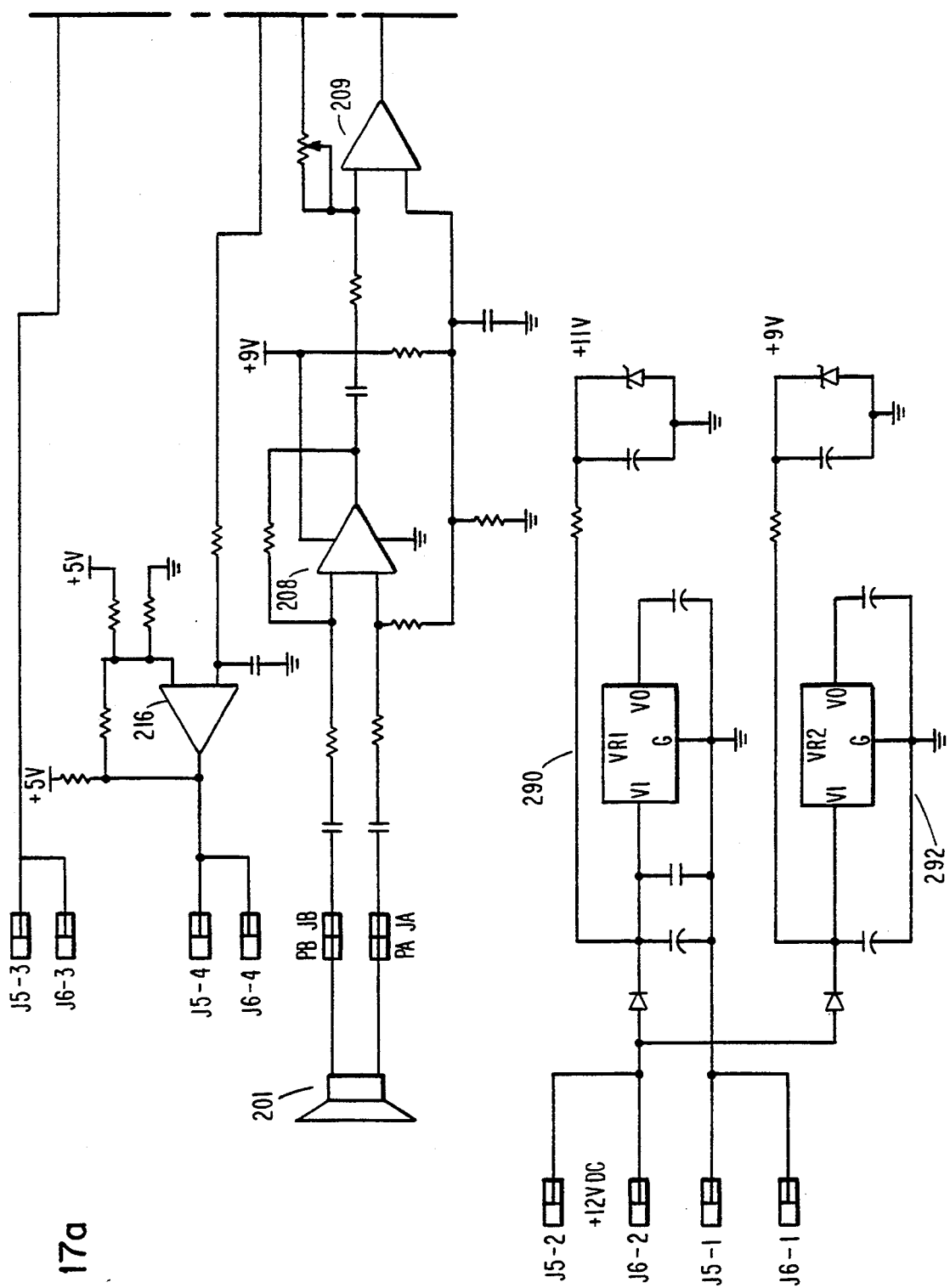

DISTANCE MEASURING SYSTEM ARRANGED TO LIMIT FALSE INDICATIONS OF DISTANCE MEASUREMENTS

This is a continuation-in-part application of Ser. No. 07/908,267 filed Jul. 2, 1992, now U.S. Pat. No. 5,303,205, which is a continuation-in-part application of Ser. No. 07/484,626 filed Feb. 26, 1990, now U.S. Pat. De. No. 340,903.

TECHNICAL FIELD

This system relates generally to electronic distance measuring systems and, more specifically, to an ultrasonic distance measuring system arranged to minimize errors caused by ringing and environmental stress.

BACKGROUND ART

A particularly stressful environment in which distance measuring systems are used is that of motor vehicle applications. Despite inaccuracy caused by vibration and other environmental factors, the need for such devices is substantial, and distance measuring systems are used to increase the safety of motor vehicle operation.

While modern vehicle design provides an operator satisfactory forward visibility during vehicle operation, vision in side and rear directions is often obstructed. To some extent operator vision is augmented by proper placement of mirrors on the vehicle. However, mirrors do not completely eliminate blind spots. For example, it is difficult to provide a satisfactory view toward the rear of a vehicle using mirrors due to obstructions caused by the body of the vehicle. Operator vision toward the rear of the vehicle is further impeded by the relatively large distance from the operator position to the rear of the vehicle common to tractor-trailer combinations and other large vehicles.

Mirrors further limit visual clues necessary for operator judgment of distance to an obstruction by limiting operator depth perception. This is a particular problem when backing a vehicle when the operator requires accurate distance information to maneuver a vehicle (e.g., a semi-tractor trailer) toward an obstruction such as a loading dock. Because of the relatively large distance between the operator and the rear if the vehicle, smaller obstructions may go unnoticed. This is also true in blind areas one either side of a vehicle where direct driver observation is not possible and mirror systems provide incomplete coverage.

Various systems have been proposed in addition to mirrors to augment operator vision. These systems include visual systems using television cameras and monitors to allow visual observation of areas not viewable through mirrors. Television augmentation is relatively extensive, requires the operator to divert his or her attention from other visual systems, and provides limited clues to determine distance to an obstruction.

Electronic obstruction detecting and ranging systems use ultrasonic, radar and infrared emitters and receivers to bounce energy off an obstruction the systems measure the time required for the emitted energy to travel to and from the obstruction to determine a distance to the obstruction.

Starke et al. U.S. Pat. No. 4,903,004, incorporated herein by reference, describes a distance measuring and signalling system for a vehicle for measuring distances to obstructions such as behind a vehicle being backed up. An array of transducers are mounted on a support such as a rear bumper of the vehicle. A pulsed signal is timed as it is converted to an ultrasonic wave signal and its echo detected. The calculated distance is displayed on a three digit display mounted on a dashboard of the vehicle. The system includes ultrasonic transmitting/receiving units, a control unit and a digital display unit.

Tendler U.S. Pat. No. 4,937,796 describes a method and apparatus for providing a voice alert to a vehicle operator. The apparatus uses sonar to detect a distance from the rear of a vehicle to a structure such as a loading dock to which the vehicle is being backed. A device converts a detected range into an audible call out of the distance from the back of the vehicle to the structure.

Naruse U.S. Pat. No. 4,674,073 describes an apparatus for use in a vehicle for ultrasonically locating and ranging an object in relation to the vehicle. A plurality of ultrasonic transmitting and receiving elements are alternately arranged in a linear array and sequentially activated to detect and locate an object. A digital display shows the location and distance to a detected object.

Chey U.S. Pat. No. 4,626,850 describes an apparatus for use in a vehicle for ultrasonically locating and ranging an object in the vicinity of the vehicle. An ultrasonic transducer is rotated in azimuth to scan an area for objects. Audio and visual display of distance and direction to a detected object are provided.

Lee U.S. Pat. No. 4,943,796 describes a display unit attachable to an inside rear view mirror of an automobile for displaying distance to an object behind the vehicle using ultrasonic sensors.

While these publications describe ultrasonic detection and ranging devices, conventional visual distance displays require the vehicle operator to divert attention away from other systems to observe the device display. Although Lee describes a display mounted on an inside mirror so that a distance display is observable near the mirror, the system still requires the vehicle operator to divert his or her vision from the mirror to the attached display. Further, this latter system is not usable with tractor-trailer combinations not having an inside rear view mirror.

The ultrasonic probe signals of the aforementioned devices can be generated using electrostatic transducers. However, these are very sensitive to environmental conditions. Consequently, piezoelectric devices are used instead since they are more robust and less sensitive to environmental effects. However, despite the more robust nature of piezoelectric devices, they display some sensitivity to the environment, and have certain inherent drawbacks. One such drawback is ringing phenomena, i.e., the generation of a false echo due to residual vibrations of a transmitting piezoelectric transducer after transmission of a probe signal. Thus, while piezoelectric transducers are less prone to breakdown than electrostatic transducers, they are subject to false readings due to ringing. These systems are also subject to false readings due too false echoes caused by extraneous environmental factors rather than actual objects meant to be detected. As safety considerations make the use of the aforementioned mirror display desirable, they also mandate a high degree of reliability in the operation of the distance measuring system.

DISCLOSURE OF THE INVENTION

Accordingly, an object of the present invention is a distance measurement and display system that can be used in a stressful environment such as being mounted on the exterior of a motor vehicle or boat.

Another object of the present invention is a distance measurement system that limits false readings due to ringing phenomena.

Yet another object of the present invention is to use ringing signals to determine system status, as well as the status of an object to be detected for distance measurement.

Still another object of the present invention is to reduce false echo indications caused by environmental factors.

According to one aspect of the present invention, a method is used to determine the status of a distance measuring device having a transducer configuration that generates ringing signals. The method includes the steps of generating a probe signal at the transducers, detecting for a ringing signal within a time period of one millisecond from the generation of the probe signal, detecting for the end of the ringing signal within a time period of three milliseconds from the generation of the probe signal, and detecting for an echo of the probe signal from an external object.

According to another aspect of the present invention, a method is used for measuring distance between a measuring device and an object external to the measuring device where the measuring device includes a transducer configuration for emitting probe signals as well as sensing echoes of the probe signals. The method includes the steps of sending a probe signal from the transducer configuration to detect an external object for the purpose of measuring the distance from that object to the transducer configuration. The method also includes the step of receiving an echo of the probe signal at the transducer configuration. The echo is converted into an electrical signal and a current distance value is derived using that signal. The current distance value is placed in a memory containing a plurality of prior distance values, and then the greatest distance value from among the stored distance values is selected from the memory, and displayed as the actual distance from the measuring device to the detected object.

According to yet another aspect of the present invention, a distance measuring system includes two transducers, one for emitting a probe signal and the second for receiving an echo of the probe signal and converting that echo into an electrical signal. Also included are processing means responsive to the electrical signal for determining a distance value between the second transducer and an external object reflecting the probe signal. Memory means are used for storing a plurality of the most recent distance values determined by the processing means, and selection means are used for selecting the greatest of the distance values stored in the memory means. This value is displayed as the distance to an external object and the distance measuring system.

According to still another aspect of the present invention, a distance measuring system is arranged to use ringing signals from a transducer arrangement to determine the status of the system. The system includes a transducer arrangement for generating a probe signal and detecting an echo signal. Also included are means for detecting and timing a ringing signal in order to determine the status of the distance measuring system based upon the elapsed time of the ringing signal.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 9b is a sectional view of the enclosure of FIG. 9a.

FIG. 9c is another sectional view of the enclosure of FIG. 9a.

FIG. 10b is a bottom sectional view of the back panel of FIG. 10a.

FIG. 11b is a bottom view of the mounting bracket of FIG. 11a.

FIG. 11c is a side view of the mounting bracket of FIG. 11a.

FIG. 12a is a front view of an ultrasonic sensor front panel.

FIGS. 12b and 12c are sectional views of the front panel of FIG. 11a.

FIG. 13a is a front view of a vehicle taillight assembly with lens cover removed to show integral ultrasonic transducer installed.

FIG. 13b is a partial sectional view of the vehicle taillight assembly of FIG. 13a with lens cover installed.

FIG. 14a is a rear view of a vehicle with the vehicle taillight assembly of FIG. 13a installed.

FIG. 14b is a partial side view of the vehicle of FIG. 14a.

FIG. 15b is a view of another side of the connection box of FIG. 15a.

FIGS. 17a and 17b is a schematic diagram of the receiver and transmitter circuitry for the ultrasonic transducers according to the present invention.

BEST MODE FOR CARRYING OUT THE INVENTION

The present invention is designed to provide reliable operation under adverse conditions, and is expected to be used in a number of different stressful environments. Such environments includes use in a variety of different configurations on a number of different vehicles, such as boats, airplanes (for taxiing purposes), construction equipment and large trucks. When used with the particular display configuration described below, the present invention is particularly efficacious when parking a tractor trailer near external objects, in part due to the reliability of the circuitry and the manner in which it is operated.

Figure 1:
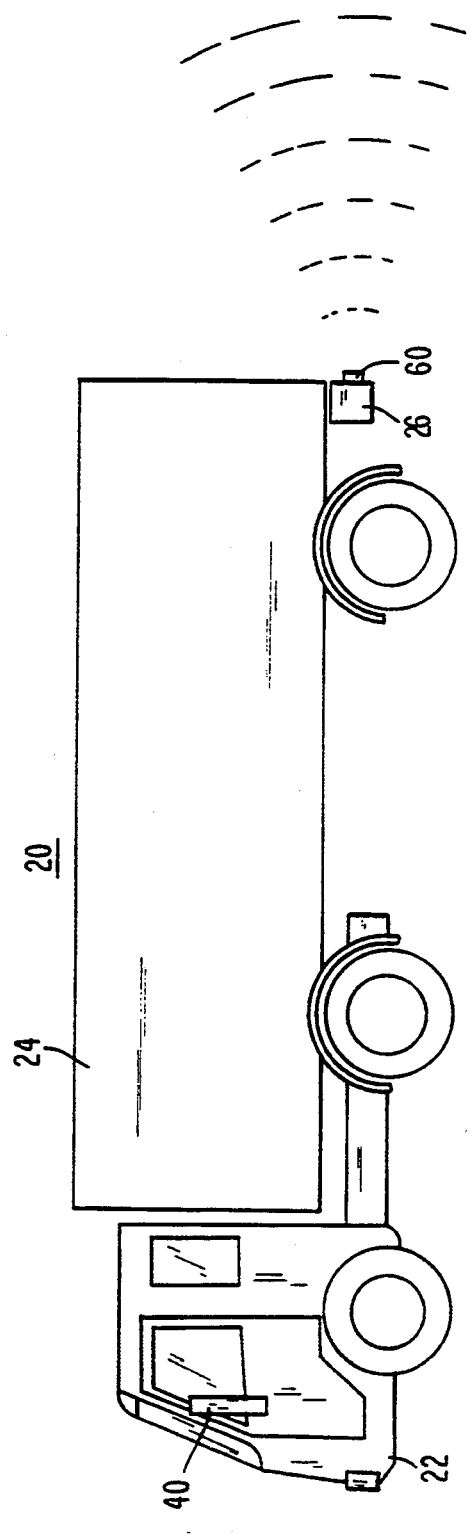
FIG. 1 is a side view of a vehicular distance measuring system according to an embodiment of the present invention installed in a vehicle.

Referring to FIG. 1, a vehicle 20 includes a combination of a tractor 22 and trailer 24. A plurality of transceivers 60 functioning as obstruction distance sensors are mounted on a rear bumper 26 of vehicle 20. The transmitters/receivers emit an ultrasonic acoustic energy wave having a frequency of 40 to 50 kilohertz (preferably 47 KHz) rearward from the vehicle into a detection space immediately behind the vehicle. Mirror display system 40 includes a conventional reflective side view mirror with a digital display mounted thereon. The digital display is visible through a transparent window in the mirror for indicating distance to a detected obstruction.

Figure 2:
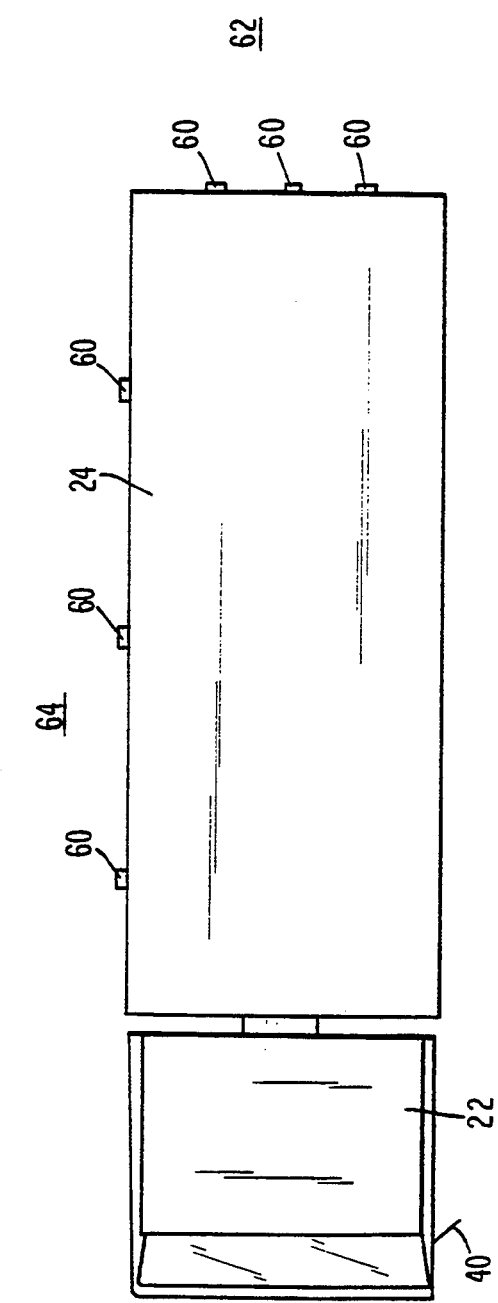
FIG. 2 is a plan view of the vehicle of FIG. 1 including the vehicular distance measuring system according to the invention.

Each transceiver 60 emits ultrasonic acoustic energy in a conical pattern. A linear array 62 of transceivers 60 is mounted along bumper 26 as shown in FIG. 2 to achieve a desired rearward obstruction detection space. The transceiver 60 is wired in parallel to simultaneously emit a pulse of ultrasonic acoustic energy and provide overlapping receive capability of a return ultrasonic echo signal.

Rear array 62 of transceivers 60 in combination with associated processing and control circuitry described below provides complete sensor coverage to detect and provide range information to obstructions located within ten feet of the rear of the vehicle. This information is provided to the vehicle operator by the digital display visible in mirror display system 40 for collision avoidance. For example, the vehicle operator can back vehicle 20 to a bay or dock while visually checking for obstructions in mirror display system 40 and simultaneously observing the distance to the bay or dock indicated by the digital display.

In addition to rear collision avoidance provided by rear sensor array 62, transceivers can be mounted along a side of the vehicle to provide augmented collision avoidance. Side facing sensor array 64 includes three transceivers 60 for detecting obstructions along the right side of vehicle 20. The array is oriented to detect vehicles in a space not readily visible to the vehicle operator and provides distance sensor information to a second channel of the processing and control circuitry for display on a second digital display of mirror display system 40.

Figure 3:
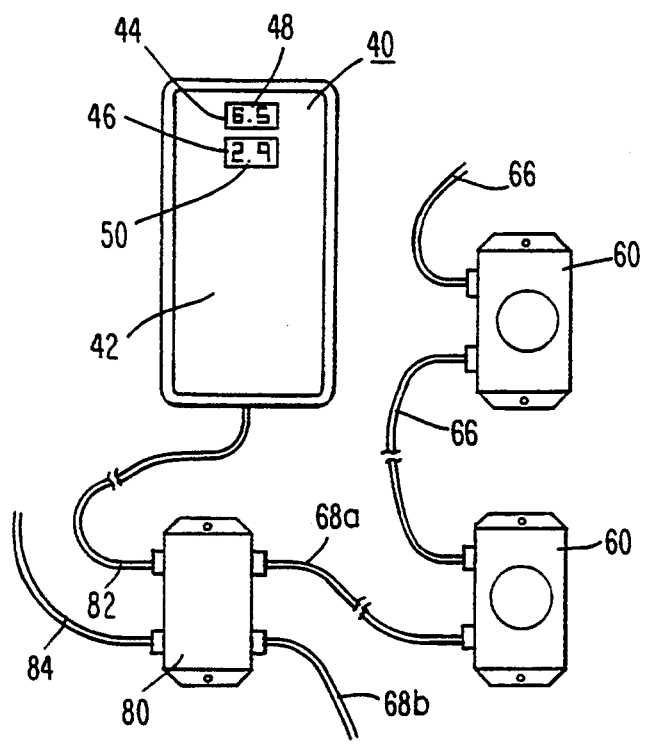
FIG. 3 is a view of major components forming the vehicular distance measuring system according to the present invention.
Figure 4:
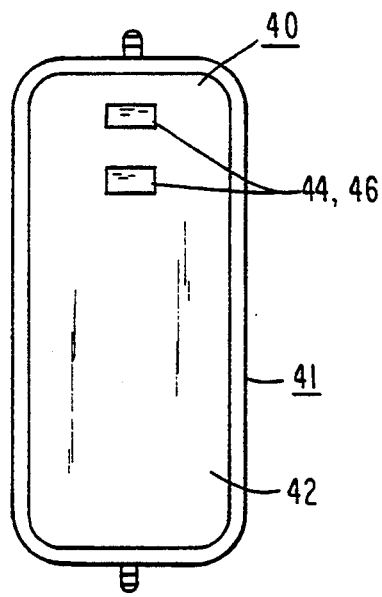
FIG. 4 is a front view of a mirror system according to the invention including a vehicle side view mirror and a pair of integral digital distance displays.
Figure 5:
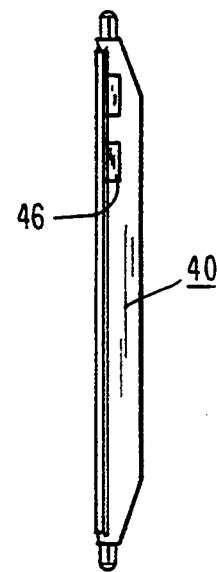
FIG. 5 is a partial sectional view of the mirror system of FIG. 4.

This embodiment of the vehicular distance measuring system includes three major components as shown in FIG. 3: mirror display system 40 with integral digital display, one or more ultrasonic transceivers 60 and connection box 80. Referring to FIGS. 4 and 5, mirror display system 40 includes a reflective "West Coast Style" side view mirror 41, approximately seven inches wide by sixteen inches high with a deep drawn stainless steel back. Mirror element 42 is either first surface chrome or silvered glass sealed in a vinyl channel to prevent component damage and to absorb shock and road vibration. Mirror display system 40 includes one or two back lighted three digit LCD displays 44,46 visible through clear windows in the mirror element. The mirror may be heated to defog or deice the unit.

Figure 18A:
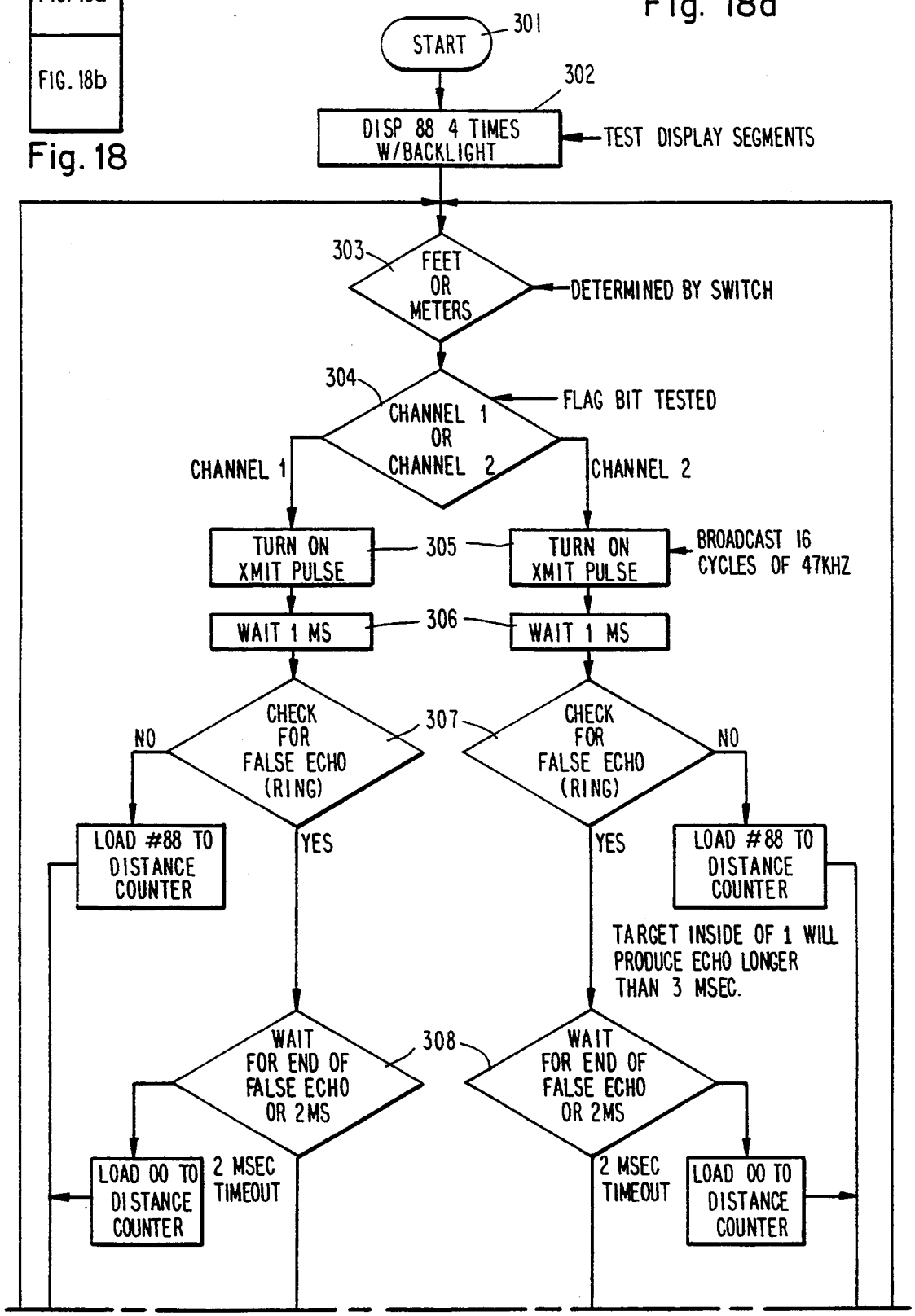
FIGS. 18a and 18b is a flow chart illustrating the operation of the present invention with respect to both ringing signals and true echoes from detected objects.
Figure 18B:
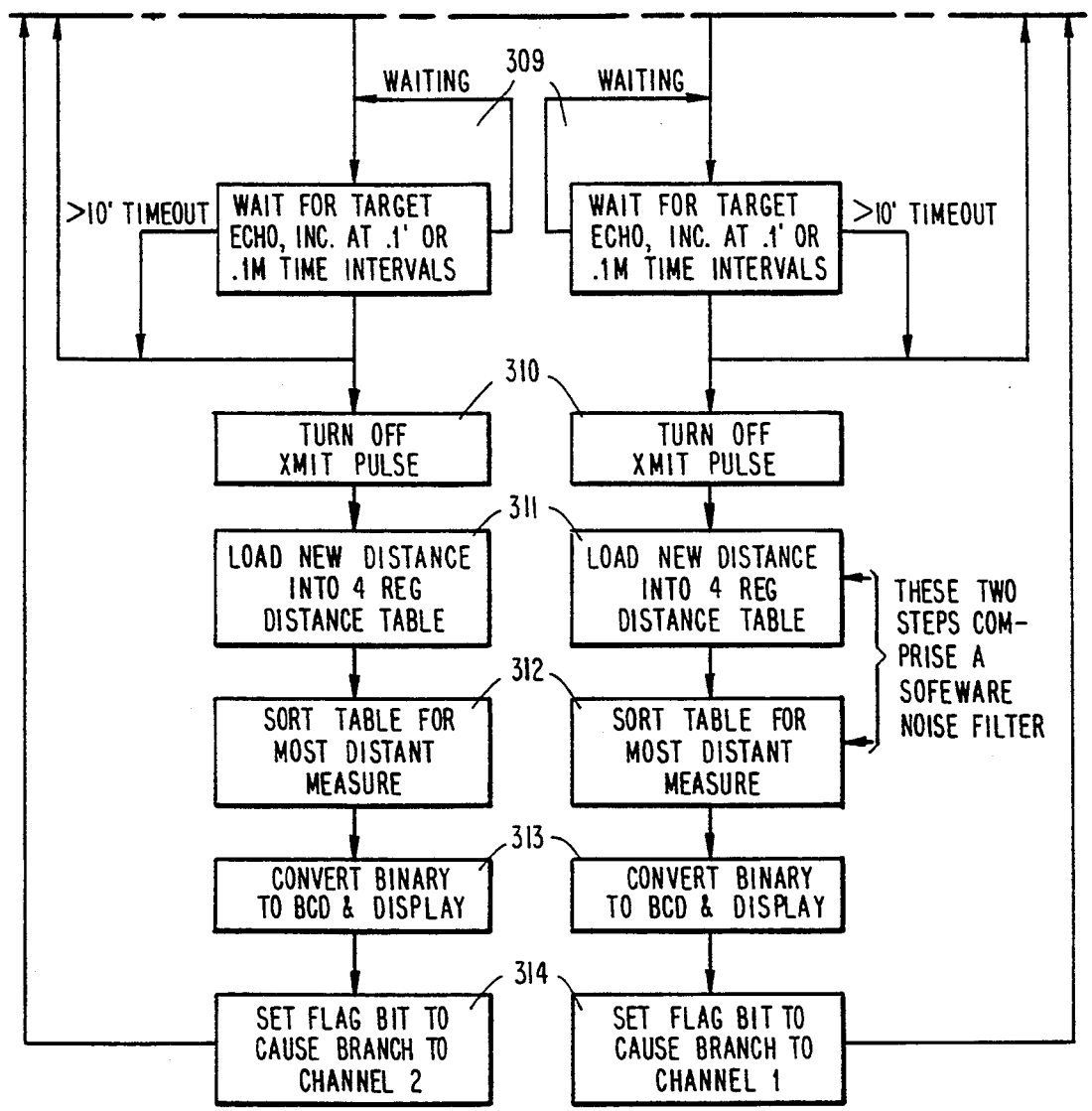

Connection box 80 supplies power to LCD display 44,46 and back-lights (not shown) and includes circuitry for operating transceiver 60 to detect and calculate a range of obstructions. The connection box includes a conventional microprocess or microcontroller for operating and receiving echo signals from the transceiver 60, calculating a range to a sensed object, processing this information, for example, by comparing the calculated range with predetermined display activation maximum distance values and, in response, activating and supplying range data signals to respective displays 44 and 46. Other processing techniques are described with respect to FIG. 18.

Connection box 80 accommodates up to two channels of sensor inputs for sensor located on the rear and one side of the vehicle. Each channel controls one or more transceivers 60 for detecting obstructions behind or to one site of the vehicle. Multiple transceiver units provide inputs to a channel to increase lateral coverage of the system. As shown in FIG. 2, multiple transceivers 60 are located along the rear and side of trailer 24 to insure full sensor coverage. The transceiver unit of both channels transmit in parallel to emit ultrasonic acoustic waves. Return ultrasonic echo signals are separately supplied by each group of sensors to the associated channel and separately processes and displayed on a respective LCD display 44, 46.

Ultrasonic transducers constituting transceivers 60 are commercially available, for example, from the Polaroid Corporotation. Each unit includes an ultrasonic transmitter for emitting an ultrasonic signal of about 50 kHz and a receiver for sensing a reflection of the emitted signal. The connection box 80 measures the time difference and calculates a distance to a sensed obstruction. If the sensed obstruction is calculated to be within a predetermined distance specified for that sensor channel, the respective LCD display and back light are activated and the distance to the obstruction is displayed.

Ultrasonic transceivers 60 are connected in series or are "daisey chained" by interconnect cables 66 to form a first channel of sensors mounted along the rear bumper of the vehicle in linear array 62. The first channel of sensors is connected by cable 68a to connection box 80 mounted in the cab of the vehicle tractor 22.

Connection box 80 includes a controller for driving transceivers 60 to emit an ultrasonic pulse, receiving a return ultrasonic echo, computing a distance to an obstruction reflecting the ultrasonic wave, and supplying a binary coded decimal (BCD) data signal indicating the computed distance. A second array of ultrasonic transceiver (not shown) forming a second sensor channel is connected to connection box 80 by cable 68b.

Figure 6:
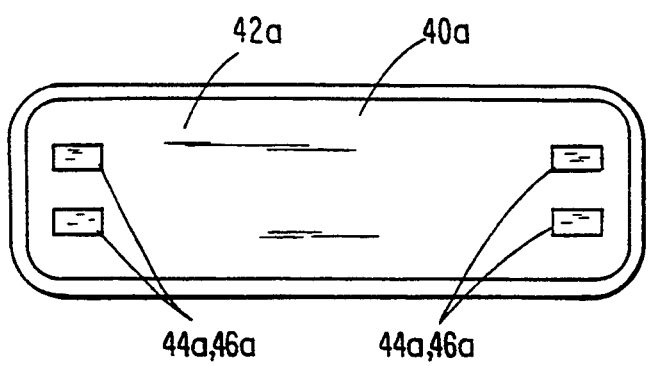
FIG. 6 is a front view of an alternate mirror system according to the present invention.
Figure 7C:
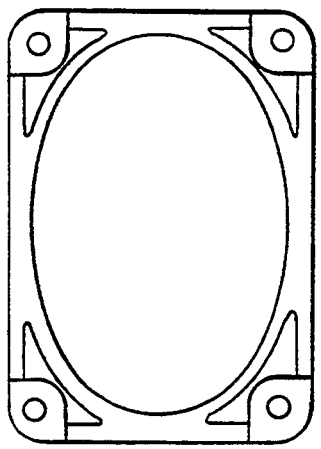
FIG. 7C is a rear view of the ultrasonic transducer of FIG. 7A.
Figure 7B:
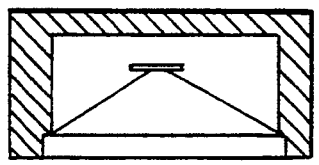
FIG. 7B is a sectional side view of the ultrasonic transducer of FIG. 7A.
Figure 7A:
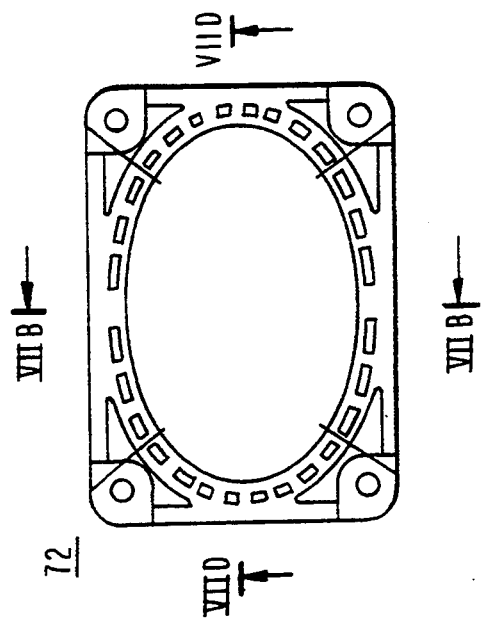
FIG. 7A is a front view of an ultrasonic transducer.
Figure 7D:
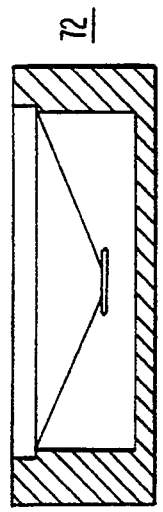
FIG. 7D is a sectional top view of the ultrasonic transducer of FIG. 7A.

An alternative mirror display system 40a for horizontal mounting within a vehicle is depicted in FIG. 6. Multiple LCD displays 44a, 46a are located along opposite side of the mirror element 42a and are visible through transparent windows formed therein.

An ultrasonic transducer 72 is shown in figures 7A–7D. The unit is relatively small in size, measuring approximately 1½ inches; wide by 1 inch high by ½ inch deep. The transducer functions as a loudspeaker to emit a pulse of ultrasonic energy and as an electrostatic microphone to receive the reflected signal or "echo." The transducer may be mounted as shown in FIG. 8 to provide a complete ultrasonic transceiver 60.

Figure 8:
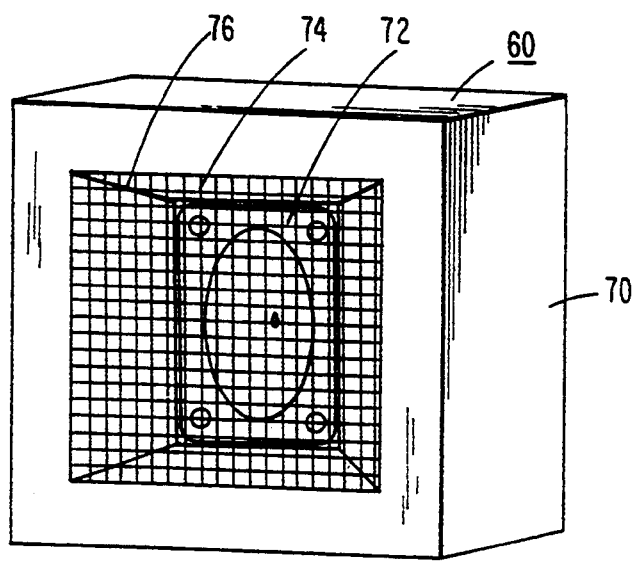
FIG. 8 is a perspective view of a sonic transmitter/receiver unit.
Figure 9C:
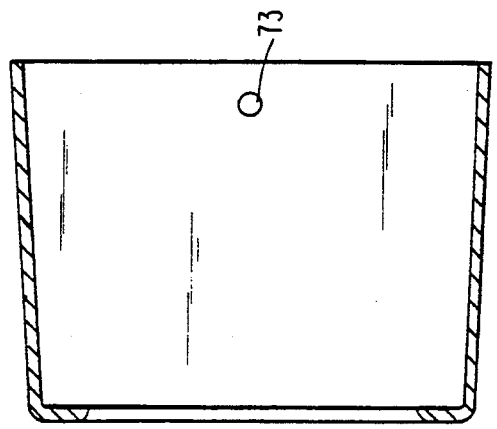
Figure 9A:
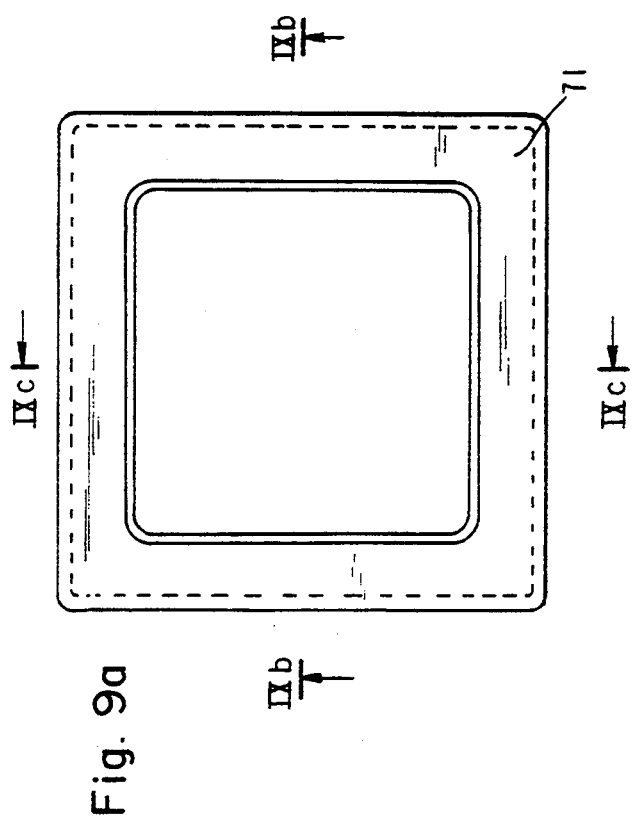
FIG. 9a is a partial front sectional view of a ultrasonic sensor enclosure.
Figure 9B:
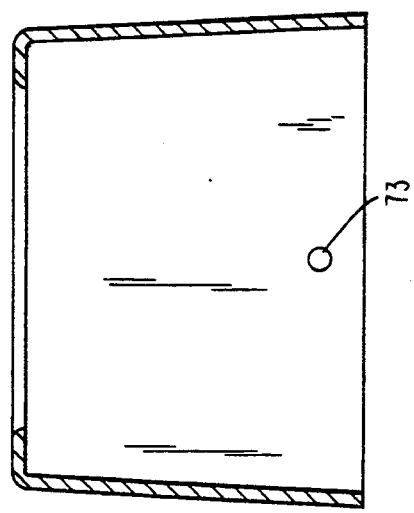
Figure 10A:
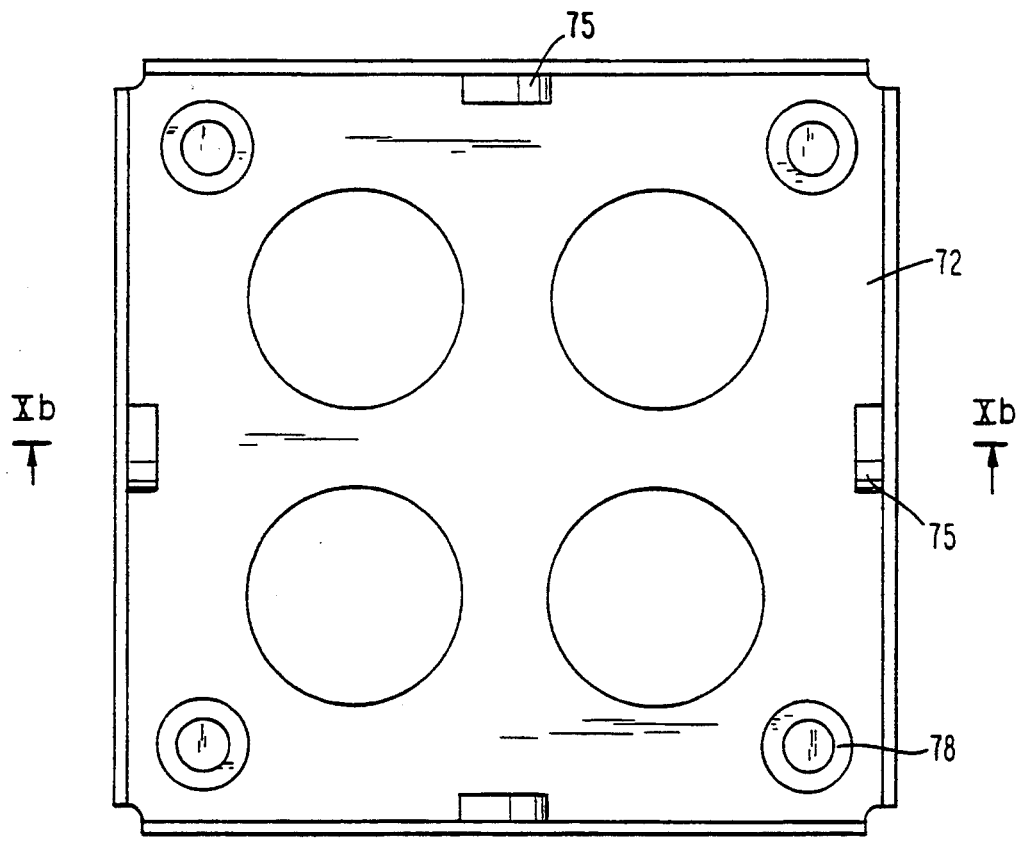
FIG. 10a is a front view of an ultrasonic sensor back panel.
Figure 10B:
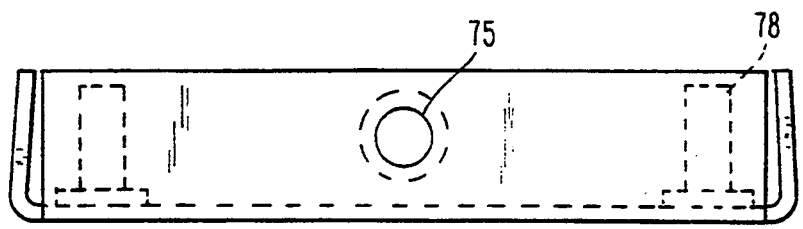

Referring to FIG. 8, transceiver 60 includes housing 70 with ultrasonic transducer 72 mounted therein. Housing 70 is made of conventional sheet metal and includes a box shaped front cover 71 (FIGS. 9a–9c) having an open back and an opposite front. A large square central aperture in the front is covered with an acoustically transparent screen 76 to protect transducer 72 from foreign objects. Cover 71 engages a peripheral lip of square ultrasonic sensor back panel 72 (FIGS. 10a and 10b) and is secured to sensor back panel 72 using bolts inserted through holes 73 of cover 71 engaging corresponding threaded apertures 75 in the lip of back panel 72.

Figure 11A:
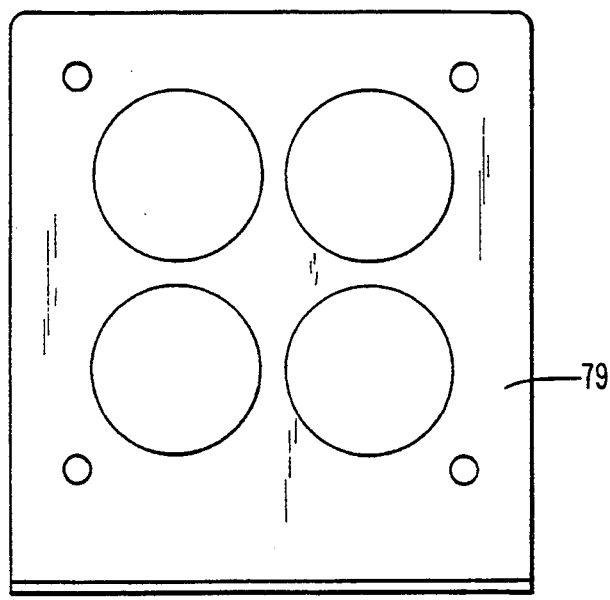
FIG. 11a is a front view of an ultrasonic mounting bracket.
Figure 11C:
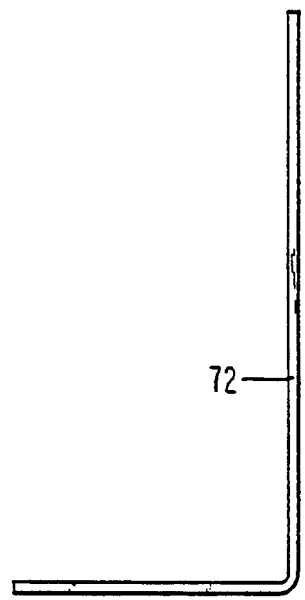
Figure 11B:
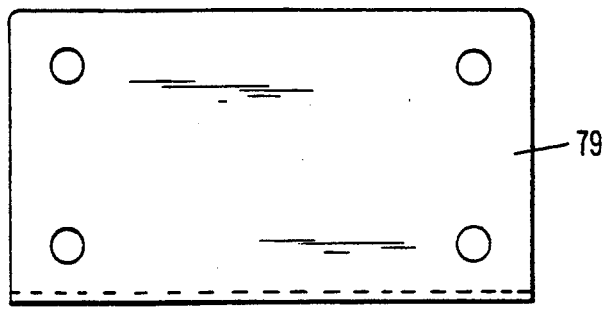

Sensor back panel 72 is secured to a vehicle by through-bolts 78. Alternatively, housing 70 may be attached to a vehicle using L-shaped ultrasonic mounting bracket 79 (FIGS. 11a–11c) which engages and secures to sensor back panel 72 using through bolts 78.

Transducer 72 is centrally positioned within housing 70 by front panel 74. Referring to FIGS. 12a–12c, front panel 74 is formed in the shape of a square with e large central square recessed portion. An oval aperture is formed in the recess portion with a plurality of holes formed thereabout for securing a transceiver to the panel.

Because the ultrasonic transducer is relatively small, it may instead be incorporated into an existing vehicle structure with minimal modification. Light units such as taillight assemblies provide environmental protection for the transducer. The assemblies include an ultrasonic transparent plastic covering as shown in FIGS. 13a and 13b or an aperture through the plastic.

Taillight assembly 130 includes a metallic taillight shell 132 with a peripheral lip for mounting the assembly in an aperture formed in the body of a vehicle. A socket lamp 134 is mounted to shell 132 by a bracket. An incandescent lamp 136 is installed in lamp socket 134 and is supplied with electric power through insulated electric wire 138 to illuminate lamp 136. Transducer 72 is installed below lamp 136 and is supported directly behind lens cover 140 by a conventional bracket member (not shown.)

Lens 140 may be a multifaceted optically translucent plastic material for projecting light emitted from lamp 136. Alternatively, the lens may form a Freznel lens to further direct and concentrate light from lamp 136. The plastic may be optically clear, partially opaque or colored as is conventional for vehicle taillights and running lights. To minimize ultrasonic attenuation, a suitable plastic type and thickness is chosen. Alternatively, an aperture 142 through the plastic or a window area of a suitable ultrasonic transparent material, such as a fine screen material, may be provided in the lens to minimize attenuation of the transmitted and received signals.

Referring to FIG. 14a, vehicle 150 includes a taillight assembly 130 mounted in the rear portion 152 of the vehicle. Thus, the vehicular measuring system may be readily installed in a vehicle by either modifying or replacing an existing taillight to incorporate an ultrasonic transducer without requiring modifications to the structure of the vehicle. Including an ultrasonic transducer in a taillight assembly 130 or running light assembly 154 on a side of the vehicle further accommodates optimal placement of the transducers without removing or relocating existing vehicle lighting.

Figure 15A:
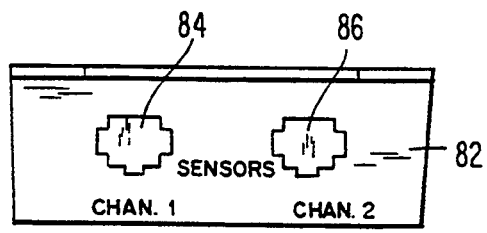
FIG. 15a is a side view of a connection box according to the invention.
Figure 15B:
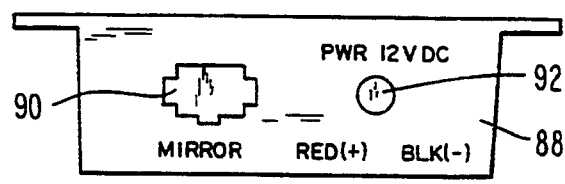
Figure 15C:
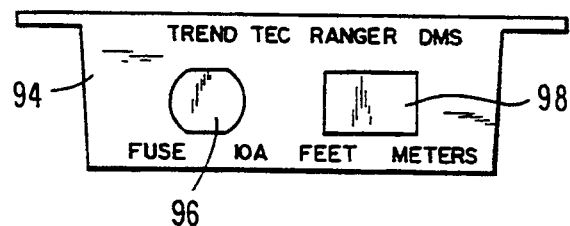
FIG. 15c is a front view of the connection box of FIGS. 15a and 15b.

Referring to FIGS. 15a–15c, connection box 80 includes a first side face 82 including connectors 84 and 86 for connecting electronics contained within the connection box to first and second daisey chained channels of transceivers. An opposite side panel 88 includes a connector 90 accepting cable 82 for supplying signals to mirror display system 40. Connector 92 is used to supply d.c. power to the connection box which distributes power to the other systems as required. Finally, a front panel 94 includes a power fuse holder 96 and a display mode switch 98 for selecting digital display readings in either feet or meters.

While the aforementioned display can be used with any of the embodiments of the present invention, it is noted that any suitable display and mounting configuration can be used as an alternative. The aforementioned mirror display while suitable for the tractor trailer, may require certain adaptations for use on an airplane, a boat or constructions equipment.

Other mechanical features which can be used in the present invention include electric heating elements for the mirror display or other types of externally mounted display devices. Another feature which can be used in the present invention includes pellicle portions forming half-silvered display windows in the mirror whereby an LCD display is only visible when back-lighted. Blank displays, being darker than the ambient light level, would not be visible so that a vehicle operator will not be distracted by the display and a full surface area of the mirror unit would constitute usable image area. All such modifications and arrangements are considered to fall within the scope of the present invention. Likewise, the location of the controlling electronics and the configuration of the housing for the electronic can be modified according to the specific environment in which the present invention is required to, operate.

Since ringing phenomenon (residual vibration signals ) is inherent to the piezoelectric devices used to generate the ultrasonic signals of the present invention, a number of steps have been taken to remove or decrease the false echo caused by the ringing phenomenon. One technique is the use of two separate power supplies as illustrated in 290 and 292 in FIG. 17. Both power supplies are isolated from each other using diodes (D1 and D3) so that the power supply 290 feeding the transmission circuit conveys no extraneous signals to the receiving circuit fed by power supply 292.

The use of two separate transducers, 200 and 201 (in FIGS. 17a and 17b) for the transmission function and the receiving function, respectively, also reduce the level of ringing in the present invention. A single piezoelectric device X1 is used as a standard for both transducers. Due to the nature of this transducer arrangement, some ringing is still inherent, and proper compensation must be made therefor. Such compensation is made by the operation of the present invention as illustrated by the flow chart of FIG. 18. The operation of the present invention in terms of utilizing ringing signals and other techniques to minimize false echo readings, is illustrated by the flow chart of FIGS. 18a and 18b. When power is applied to the system at step 301, the display is automatically tested four times. In the embodiment of the invention used with a motor vehicle having the transducers mounted with the back-up lights, the testing takes place with operation of the back-up lights. The operator can then determine whether the distance measurements will be indicated in feet or meters by using a manual switch at step 303. Next, either the first or second channel is selected at step 304. However, more channels (depending on transducer numbers) can be used. Since the operation of each channel is identical to that of the other, the same step numbers are used to designate the operation of each channel.

Figure 17B:
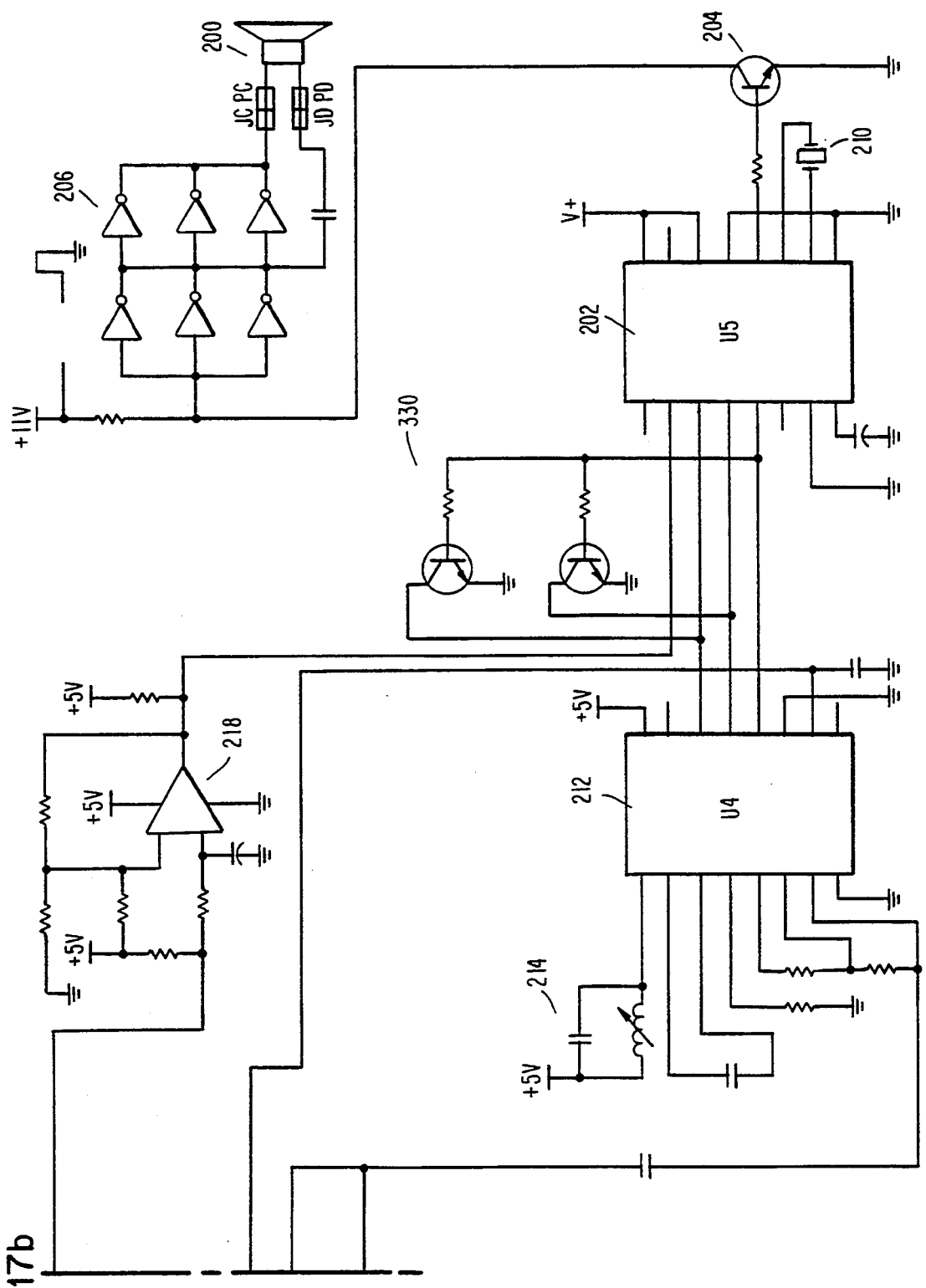

In step 305, a pulse is transmitted from ultrasonic transducer 200 (FIG. 17a and 17b). The signal emitted is a probe signal of sixteen cycles based upon a 47 KHz generated signal. With the transmission of this probe signal there will be some residual generation in the transducer. If a ringing signal is not detected after one millisecond (step 306), it is assumed that a system default has occurred and indication is sent to the display (step 307) so that the display reads 88, indicating an open circuit or some other system malfunction. Consequently, what is normally considered a source c,f error or noise is utilized to determine the operability of the present invention.

If the false echo or ringing signal is detected at step 307, then the duration of the ringing signal is timed (step 308) for an additional period of two milliseconds. If the ringing signal has lasted longer than this period (a total of three milliseconds), then a signal is sent to the display to indicate that a real target has been detected and that it is within one foot of the transducers. Consequently, the display indicates a distance of zero so that an operator knows that increased proximity of the vehicle with the external object is not practical. Even though the external detected object may be more than a foot away from the vehicle, the present invention does not provide sensitivity within a distance of one foot. Consequently, a distance of zero is displayed to the operator.

If the ringing signal has ended within the three millisecond time period, the system will begin to detect for echoes of the transmitted probe signal at time intervals corresponding to one tenth of a foot or one tenth of a meter (step 309), depending upon which was selected at step 303. As soon as an echo is received the transmit pulse is turned off, and no additional echoes are registered until the next transmit pulse is initiated (step 310). In this way, the closest potential object is registered and signals for more distance objects are ignored. While not shown in the flow chart, a determination is made as to the distance corresponding to the received echo.

This distance is stored in a table or some other sort of memory with previous distance measurements. For example, the four most recent distance measurements can be stored as indicated at step 311. As indicated at step 312, the table or memory is sorted to determine and select the greatest distance measurement. This value is then converted from the binary data used in the memory to a form suitable for display (step 313). By selecting only the greatest distance measurement out of the group of the most recent distance measurements, false indications due to environmental features (noise targets) will be minimized. It is assumed that the greatest distance measurement will be that of the nearest actual object since additional echoes are not registered after the first one is received during a transmission sequence. Thus, it is highly probable that a legitimate echo for an actual object will be detected at least one out of every four readings. However, there are limitations regarding this technique in that if a noise signal is read four times in a row it will be recognized as an echo from an actual object. This will not occur very frequently since most noise is of short duration such as a short burst of compressed air.

Figures 16, 16A:
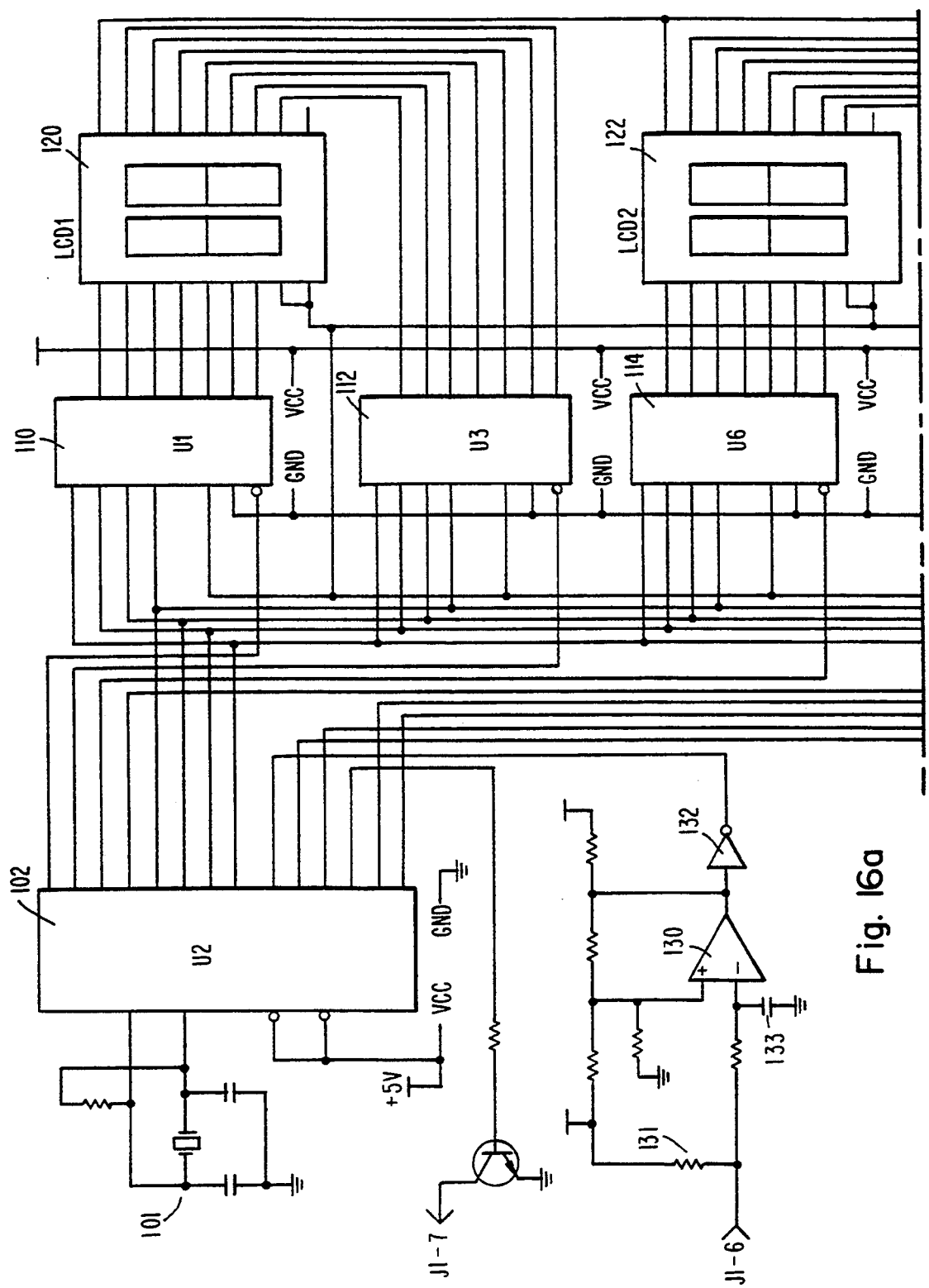
FIGS. 16a and 16b is a schematic diagram of a circuit for the controller and display electronics of the distance measuring system according to the present invention.
Figure 16B:
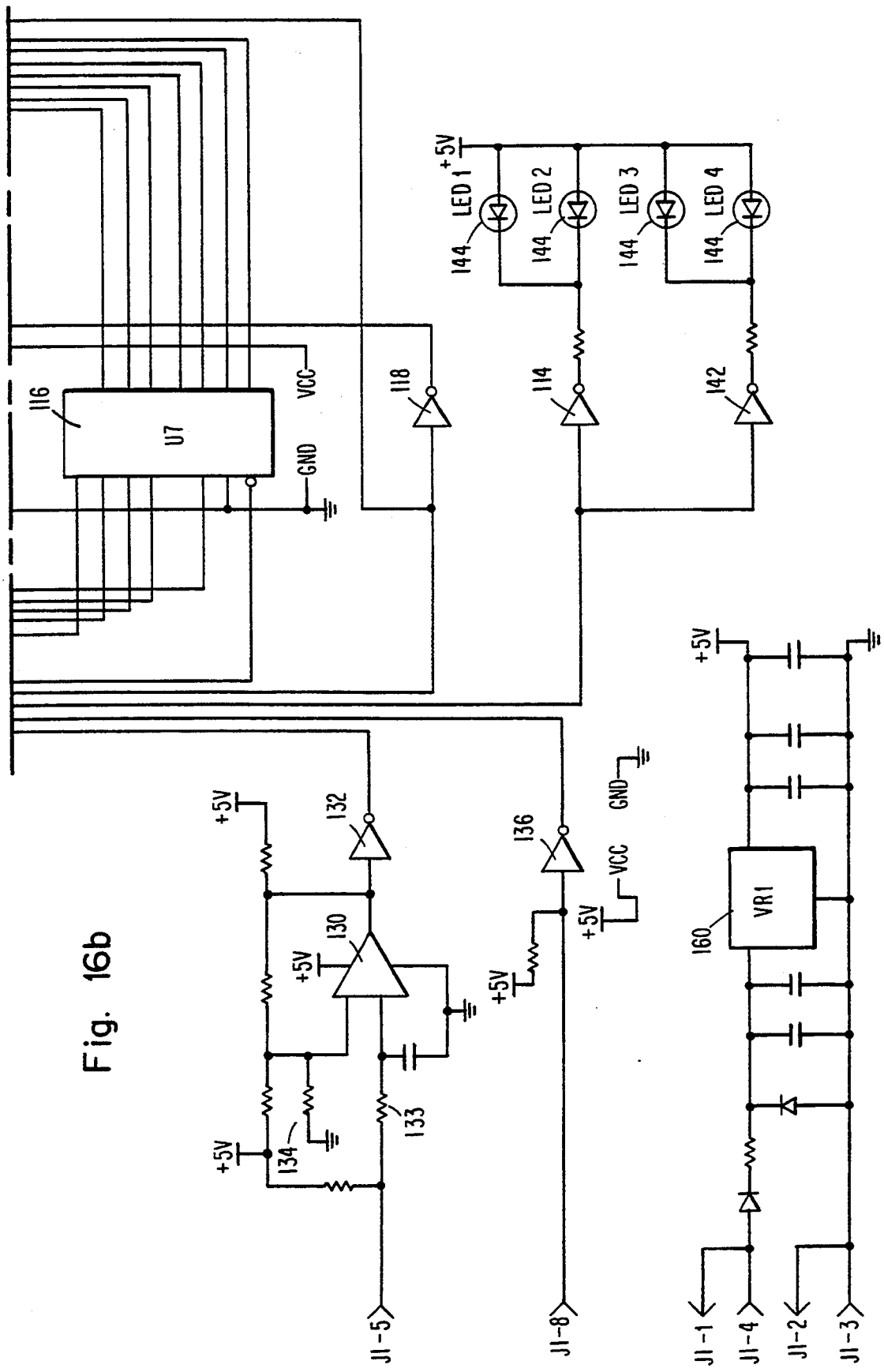

The control electronics of housing connector blocks 80 and the display electronics are shown in the schematic diagram of FIGS. 16a and 16b. A conventional microcontroller 102 is utilized, and can be a Motorola device number 68HC705J2. The microcontroller 102 includes an on-chip erasable programmable read-only memory (EPROM) storing a set of operating instructions, random access memory (RAM) for temporary storage of operating data, a central processing unit for performing arithmetic and logic operations, and first and second parallel input/output (I/O) ports PA0–PA7 and PB0–PB7. First I/O port PA0–PA7 of microcontroller 102 controls I/0, terminals PA0–PA3 supplying parallel MOS level BCD data signals to display drivers 110–116. The remaining I/O terminals PA7–PA4 of the first I/O port are connected to respective display enable terminals of display drivers 110–116. The display drivers 110–116 are binary-coded-decimal (BCD) to seven segment convertors/drivers and displays 120, 122 are seven-segment liquid crystal displays (LCDs). Output terminals N–G of display drivers 110–116 are connected to respective segments of LCD displays 120 and 122. Piezoelectric device 101 is used as a standard for the internal clock signal of the microcontroller 102.

A first I/O terminal PB0 of the second output port is connected in parallel to light emitting diodes (LEDs) 144 through drivers 140 and 142. LEDs 144 can be mounted in the aforementioned mirror display system behind LCD displays 120 and 122 to illuminate the displays in response to detection of an obstruction within a predetermined threshold distance.

I/O terminal PB1 of the second output port provides a clock signal to display drivers 110–116 and LCD displays 120 and 122. The clock signal is used to synchronize data transfers from the first output port of microprocessor 102 to display drivers 110–116 and LCD displays 120 and 122.

I/O terminal PB2 provides a transmit control signal under program control to each of the transceivers through bipolar transistor Q1. I/O terminal PB3 receives a logic signal from display mode switch 98 through amplifier 136. Microprocessor 102 periodically reads the logic level at I/O terminal PB3 and scales a computed distance to a detected obstruction to selectively display the distance in either feet or meters. Further, I/O terminals PB5 and PB4 receive respective echo signals ECHO1 and ECHO2 from first and second sensor channels.

Each sensor channel includes a comparator 130 receiving at an inverting input an echo signal from a respective ultrasonic transceivers in parallel comprising a sensor channel. A noise suppression capacitor is connected from the inverting input terminal of comparators 130 to ground. A non-inverting input of the comparator is connected to a reference voltage. If any of the transceivers detect an ultrasonic return echo signal, current is drawn through pull-up resistor 134 connected to the inverting input terminal causing the voltage level applied to the inverting terminal to decrease, i.e., go low with respect to the reference voltage. The output from comparator 130 is supplied to invertor 132 which reinverts the signal level and supplies a respective echo signal to input terminals PB5 and PB4.

Power to all components of FIG. 16a and 16b is provided by voltage regulator 160. In vehicle applications of the present invention, nominal vehicle 12 volt power can be supplied to voltage regulator 160 which supplies five volt MOS operating voltage to system components. Twelve volt direct current is supplied directly to electrical heater units of the mirror display units.

FIGS. 17a and 17b is a schematic diagram of a transceiver including two ultrasonic transducers 200 (for transmission) and 201 (for reception). The transmitter circuit includes ultrasonic piezoelectric transducer 200, and transmit controller 202 which receives a transmit control signal from microcontroller 102 (in FIGS. 16a and 16b). Transmit controller 202 can be provided by Texas Instruments device number TL851. The transmit pulse from the microcontroller 102 is buffered by comparator 218 before being applied to transmit controller 202. The transmit controller outputs sixteen cycles of a 47 KHz oscillator into a CMOS driver circuit 206 which drives the transmission transducer 200 to produce the probe signals. The transmit controller 202 also outputs a digital gain control signal to the receiver controller 212 (such as Texas Instruments device number KL852). Gain in the receiver circuit is stepped up as time (distance to a measured object) is increased after the transmission of the probe signal. These steps are modified by ramp circuit 220 which includes transistors Q1 and Q2. At a certain predetermined distance or time delay, for example, four feet, the gain is held constant for all additional increases in measured distance. This results in fewer false readings at extended ranges from about five to ten feet, while still allowing sufficient sensitivity at closer arranges.

The gain of the receiving circuit is adjusted by means of amplifier 209 which is part of the input circuit along with differential amplifier 208 and transducer 201. The differential amplifier has a gain of approximately six and is coupled through amplifier 209 to receiver controller 212 which has a gain of approximately three. Also included in the receiving circuit is tuned circuit 214 including L1 which must be set for maximum response for each specific transducer pair. The output of the receiving controller 212 is buffered by a pair of comparators 130 (in FIG. 16) before being fed to the microcontroller 102 as an echo signal. Microcontroller 102 handles the function of timing (facilitated by piezoelectric device 101) BCD generation, display output, etc.

Ultrasonic waves received by transducer 201 are converted to electrical signals and supplied via comparator 208 and amplifier 209 to processor 212. Upon detecting the predetermined frequency as set by tune circuit 214, receiving processor 212 supplies a detector signal to an inverting input of comparator 216. The output of comparator 216 is provided in parallel with the output of other such circuits from other sensor arrays to controller 102.

In operation, microprocessor 102 periodically supplies a transmit control signal in parallel to ultrasonic transceivers of both channels and initiates a timing operation. In response to a transmit control signal from microcontroller 102, the transmitters of each transceiver generates an ultrasonic signal. Microcontroller 102 alternately detects signals from each of the channels and, using the aforementioned timing sequence, determines a round trip time required for the acoustic wave energy to travel to, and return from the external object so that a distance between the external object and the sensor configuration can be determined.

In summary, the present invention provides an object detection and arranging system which can be mounted in a variety of different packages for a variety of different environments, such as a mirror display on a vehicle. While there have been described and illustrated several specific embodiments of this invention with respect to electronic configuration, operation, mounting and display packages, it is clear that variations in the details of the embodiments specifically illustrated and described may be made without departing from the true spirit and scope of the invention as defined in the appended claims. For example, although the system is described including two channels of sensors, fewer or greater numbers of channels may be incorporated to provide a desired hazard warning detection zone. Further, although ultrasonic ranging is described, other ranging systems may be used including radio detection and ranging (radar and infrared radiation).

Although the present invention has been described and illustrated in detail, it is clearly understood that the same is by way of illustration and example only and is not to be taken by way of limitation, the spirit and scope of the present invention being limited only by the terms of the following claims.

I claim:

1. A method of determining the status of a distance measuring device having a transducer configuration that generates ringing signals, the method comprising the steps of:

(a) generating a probe signal at said transducer configuration;

(b) detecting for a ringing signal within a time period of substantially one millisecond from the generation of the probe signal by said transducer configuration;

(c) detecting for the end of said ringing signal within a time period of substantially three milliseconds from the generation of the probe signal; and (d) detecting for an echo of said probe signal from an external object.

2. The method of claim 1 wherein step (a) further comprises the sub-step of indicating a system default when a ringing signal is not detected within the one millisecond time period.

3. The method of claim 1 wherein step (c) further comprises the sub-step of indicating that an object is detected and located within approximately one foot of said sensor arrangement when said ringing signal is detected to last more than three milliseconds.

4. The method of claim 1 wherein step (d) further comprises the sub-step of indicating that no object is detected within approximately ten feet of said transducer configuration when an echo of said probe signal is not detected within a predetermined time after the end of said three millisecond time period.

5. The method of claim 4 wherein echoes of said probe signal are detected for at time intervals corresponding to approximately 0.1 feet after said ringing signal ends.

6. The method of claim 1, further comprising the step of mounting a said transducer configuration on a vehicle to detect the presence of an object within ten feet of a portion of said vehicle containing said transducer configuration.

7. The method of claim 4, further comprising the step of determining a distance measurement from said transducer configuration to a detected object when an echo of said probe signal is received before said predetermined time period; and displaying said distance measurement.

8. A method for measuring distance between a measuring device and an object external to said measuring device, said measuring device including a transducer configuration for emitting probe signals and sensing echoes of said probe signals, the method comprising the steps of:
(a) sending a probe signal from said transducer configuration;
(b) receiving an echo of said probe signal at said transducer configuration and de-activating said transducer configuration for purposes of receiving until a subsequent probe signal is transmitted;
(c) converting said echo into an electrical signal;
(d) deriving a current distance value from said electrical signal;
(e) placing said current distance value in a memory containing a plurality of a prior distance values;
(f) selecting a greatest distance value from among said stored distance values in said memory; and
(h) displaying said selected greatest distance value.

9. A distance measuring system arranged to use ringing signals to determine system status, said system comprising:
(a) a transducer configuration for emitting a probe signal and generating ringing signals;
(b) means for detecting a ringing signal;
(c) means for timing a detected ringing signal; and
(d) display means responsive to time duration of a detected ringing signal.

10. The method of claim 8, further comprising the sub-step of detecting for a ringing signal generated by said transducer configuration.

11. The method of claim 8, wherein step (d) further comprises the sub-step of amplifying said electric signal in accordance with previously stored distance values.

12. The method of claim 11, wherein amplification of said electric signal is proportionate to detected distance between a distance of zero and a predetermined distance.

13. The method of claim 12, wherein said predetermined distance is approximately four feet, and said gain remains constant for detected distances between substantially four and ten feet.

14. The method of claim 8, further comprising the step of testing a display associated with said transducer configuration before the step of sending said probe signal from said transducer configuration.

15. The method of claim 8, further comprising the step of mounting said transducer configuration on a vehicle.

16. A distance measuring system, comprising:
(a) a first transducer for emitting a probe signal;
(b) a second transducer, associated with said first transducer, for receiving an echo of said probe signal and converting said echo into an electrical signal;
(c) processing means responsive to said electrical signal for determining a distance value between said second transducer and an object reflecting said probe signal from said first transducer;
(d) memory means for storing a plurality of the four most recent distance values determined by said processing means;
(e) selection means for selecting a greatest one of said plurality of most recent distance values in said memory means; and
(f) display means for displaying said selected distance value.

17. The system of claim 16 further comprising means for mounting said system on a vehicle.

18. The system of claim 16 further comprising means for generating a 47 KHz signal;
driver means for said first transducer; and
buffering means for applying sixteen cycles of said 47 KHz signal to said transducer drivers.

19. The system of claim 18, further comprising a piezoelectric crystal resonator arranged as a standard for both said first and second transducers.

20. The system of claim 16, an amplifier for amplifying said electrical signal based upon prior distance values so that amplifier gain is directly proportional to detected distance up to a predetermined distance value.

21. The system of claim 20 wherein said predetermined distance value is approximately four feet, and said gain for a distance between substantially four feet and ten feet remains constant.

22. The system of claim 16 wherein said processing means comprises a receiver section and a transmitter section, wherein said receiver section and said transmitter section each has a separate isolated power supply.

23. The system of claim 16 wherein said processing means further comprise timing means arranged to control said second transducer to detect for an echo signal at intervals of approximately one millisecond.

24. The system of claim 16, further comprises means for testing said display means.

25. The system of claim 16, wherein said probe signal is an ultrasonic signal.

26. The method of claim 8, wherein said probe signal is an ultrasonic signal.

* * * * *